United States Patent
Bihy et al.

(10) Patent No.: US 7,585,794 B2
(45) Date of Patent: Sep. 8, 2009

(54) VAPOR RETARDER WITH SHIELDING AGAINST ELECTROMAGNETIC FIELDS

(75) Inventors: Lothar Bihy, Kaiserslautern (DE); Birgit Boge, Mannheim (DE); Horst Keller, Wilhelmsfeld (DE)

(73) Assignee: Saint-Gobain Isover (FR)

( * ) Notice: Subject to any disclaimer, the term of this patent is extended or adjusted under 35 U.S.C. 154(b) by 221 days.

(21) Appl. No.: 10/576,902

(22) PCT Filed: Oct. 18, 2004

(86) PCT No.: PCT/EP2004/011781

§ 371 (c)(1),
(2), (4) Date: Jan. 9, 2007

(87) PCT Pub. No.: WO2005/040517

PCT Pub. Date: May 6, 2005

(65) Prior Publication Data

US 2007/0093155 A1    Apr. 26, 2007

(30) Foreign Application Priority Data

Oct. 22, 2003  (DE) ................. 103 49 170

(51) Int. Cl.
B32B 27/04 (2006.01)
B32B 27/12 (2006.01)
B32B 5/02 (2006.01)

(52) U.S. Cl. .......... 442/117; 442/85; 442/394; 442/398

(58) Field of Classification Search ........ 442/85, 442/117, 394, 398

See application file for complete search history.

(56) References Cited

U.S. PATENT DOCUMENTS

| 4,467,005 | A | 8/1984 | Pusch et al. |
| 4,928,898 | A | 5/1990 | Audren et al. |
| 5,243,126 | A | 9/1993 | Chow et al. |
| 5,346,868 | A | 9/1994 | Eschner |
| 5,554,324 | A | 9/1996 | Bernard et al. |
| 5,601,628 | A | 2/1997 | Battigelli et al. |
| 5,614,449 | A | 3/1997 | Jensen |
| 5,900,298 | A | 5/1999 | Syme et al. |
| 5,962,354 | A | 10/1999 | Fyles et al. |
| 6,074,967 | A | 6/2000 | Erskine |
| 6,158,249 | A | 12/2000 | Battigelli et al. |
| 6,284,684 | B1 | 9/2001 | Vignesoult et al. |
| 6,358,872 | B1 | 3/2002 | Karppinen et al. |

(Continued)

FOREIGN PATENT DOCUMENTS

CH    659755    2/1987

(Continued)

OTHER PUBLICATIONS

Balcerowiak et al. "Thermal Stability of Binder For Mineral Wool Insulations", Journal of Thermal Analysis, 1995, vol. 43, pp. 299-303.

(Continued)

*Primary Examiner*—Norca L Torres-Velazquez
(74) *Attorney, Agent, or Firm*—Sheridan Ross P.C.

(57) ABSTRACT

The present invention concerns a vapor retarder for indoor sealing of buildings, especially roof structures, with at least one barrier layer (1) retarding passage of moisture vapor, especially water vapor, with the vapor retarder also having an electromagnetic-field-(EMF)-shielding layer (EMF layer) (2).

15 Claims, 2 Drawing Sheets

U.S. PATENT DOCUMENTS

Figure 1:
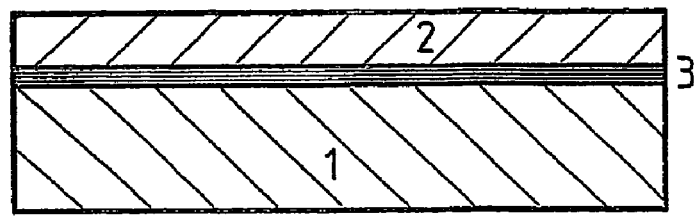

| | | | |
|---|---|---|---|
| 6,512,173 | B1 | 1/2003 | Muth |
| 6,797,356 | B2 * | 9/2004 | Zupon et al. ............... 428/131 |
| 6,851,283 | B2 | 2/2005 | Baracchini et al. |
| 2007/0184740 | A1 | 8/2007 | Keller et al. |
| 2008/0014422 | A1 | 1/2008 | Keller et al. |
| 2008/0196638 | A1 | 8/2008 | Keller et al. |

FOREIGN PATENT DOCUMENTS

| | | | |
|---|---|---|---|
| DE | 3612857 | | 9/1986 |
| DE | 19604238 | | 8/1997 |
| DE | 29711054 | | 2/1998 |
| DE | 19747622 | | 4/1999 |
| DE | 19942882 | | 6/2001 |
| DE | 10256434 | | 6/2003 |
| EP | 0123965 | A2 * | 11/1984 |
| EP | 0399320 | | 11/1990 |
| EP | 0525816 | | 2/1993 |
| EP | 0551476 | | 7/1993 |
| EP | 0583791 | | 2/1994 |
| EP | 0583792 | | 2/1994 |
| EP | 0741003 | | 11/1996 |
| EP | 0821755 | | 2/1998 |
| EP | 1097807 | | 5/2001 |
| EP | 1157974 | | 11/2001 |
| EP | 1182177 | | 2/2002 |
| EP | 1296002 | | 3/2003 |
| WO | WO 89/12032 | | 12/1989 |
| WO | WO 94/04468 | | 3/1994 |
| WO | WO 95/32925 | | 12/1995 |
| WO | WO 02/070417 | | 9/2002 |
| WO | WO 03/047850 | A1 | 6/2003 |

OTHER PUBLICATIONS

Written Opinion for International (PCT) Patent Application No. PCT/EP2004/011781.
International Preliminary Report on Patentability for International (PCT) Patent Application No. PCT/EP2004/011781.
International Search Report for International (PCT) Patent Application No. PCT/EP2004/011061.
Written Opinion (including translation) for International (PCT) Patent Application No. PCT/EP2004/011061.
International Preliminary Report on Patentability (including translation) for International (PCT) Patent Application No. PCT/EP2004/011061.
International Search Report for International (PCT) Patent Application No. PCT/EP2004/011063.
Written Opinion (including translation) for International (PCT) Patent Application No. PCT/EP2004/011063.
International Preliminary Report on Patentability (including translation) for International (PCT) Patent Application No. PCT/EP2004/011063.
International Search Report for International (PCT) Patent Application No. PCT/EP2004/011062.
Written Opinion (including translation) for International (PCT) Patent Application No. PCT/EP2004/011062.
International Preliminary Report on Patentability (including translation) for International (PCT) Patent Application No. PCT/EP2004/011062.
Official Action for U.S. Appl. No. 10/575,009, mailed Jun. 25, 2008.
Official Action for U.S. Appl. No. 10/575,018, mailed Jul. 24, 2008.
Official Action for U.S. Appl. No. 10/575,009, mailed Feb. 6, 2009.
Official Action for U.S. Appl. No. 10/575,018, mailed Feb. 5, 2009.

* cited by examiner

VAPOR RETARDER WITH SHIELDING AGAINST ELECTROMAGNETIC FIELDS

The invention concerns a vapor retarder as set out in the generic part of claim 1.

Vapor retarders are known in construction technology, e.g. for protecting roof structures against room moisture, and, for this purpose, are installed inside the room, e.g. on the rafters, to prevent passage of moisture, especially water vapor, to the thermal insulation usually installed in the roof structure, since otherwise it might be damaged.

Conventional vapor retarders that, in accordance with prior art, are attached to the inside of the section of the building to be insulated should be air-tight on the one hand and on the other should prevent moisture in the room air from diffusing into that building section without further ado, a process that is especially favored in winter by the fact that the external air is colder than the room air, as this causes a large temperature gradient from the inside to the outside. Diffusion of the warm room air enriched with moisture into, for example, the thermal insulation of a roof would lead, on account of increasing chilling towards the outside, to condensation of the moisture in the thermal insulation, a fact that can impair the insulation effect on the one hand and can damage the roof structure on the other. Conventional vapor retarders have a vapor diffusion resistance $s_D > 100$ m diffusion-equivalent air layer thickness, with these vapor retarders being especially used for buildings subject to high moisture loads, especially large-scale catering establishments, indoor swimming pools and the like, since the barrier layer there is required to be especially air-tight. In addition, vapor retarders are used which are also air-tight, but which additionally offer a degree of vapor permeability. Their $s_D$ value is usually in the region greater than 2 m diffusion-equivalent air layer thickness. Common vapor retarders similarly permit passage in both directions, i.e., the ratio of summer/winter is 1 to 1.

To improve the ratio of summer/winter, variable vapor retarders are also known that have a low vapor diffusion resistance at high ambient moisture levels and a high diffusion resistance at low ambient moisture levels. Consequently, a variable vapor retarder has a high vapor diffusion resistance in line with the lower uptake of moisture by cold air when the air moisture level is low in winter, while it has a lower vapor diffusion resistance in summer consistent with the higher moisture content of warm air in summer. In this way, the variable vapor retarder functions virtually as a vapor barrier in winter, i.e. only a slight amount of moist room air gets into the thermal insulation, whereas in summer, when the room moisture level is high and the vapor diffusion resistance is low, moisture can migrate into the building from the insulation or roof structure and this can dry out. The ratio of summer/winter in this case can be 25 to 1. European Patent EP 0 821 755 discloses for this purpose of moisture control a moisture-adaptive vapor retarder that has material properties that suitably vary with the ambient moisture and that fulfils the requirements imposed on different retarding effects as regards water vapor diffusion, a fact that increases the functionality commensurately. Nevertheless, there is further need for expanding the functionality and improving such components, especially for roof structures.

It is therefore the object of the invention to provide an improved vapor retarder, especially for use in roof structures, that offers expanded functionality.

This object is achieved by the subject of claim 1, with appropriate further embodiments of the invention being characterized by the features contained in the sub-claims.

The inventors have recognized that, starting from the moisture-adaptive vapor retarder which functions not as a pure vapor barrier that simply prevents passage of water vapor but rather contains regulation of the blocking function, it is of advantage to implement a further function in the vapor retarder to shield against electro-smog. The inventors have recognized that the vapor retarder can be furnished with a layer that shields against electromagnetic fields (EMF), such that the vapor retarder of the invention offers protection against electrosmog in addition to the moisture-regulating effect, with no need for independent installation, i.e. one product performs several measures at once.

Electromagnetic fields of the kind emitted by high and low frequency sources have featured more and more prominently in debates in recent years as possible causes of effects that impact on the health of the human organism. The strong rise in the emission of electromagnetic fields due to the expansion of sources in recent years, especially due to the construction of the various mobile telephone networks, has boosted fears about a disproportionate increase in so-called "electro-smog".

Under the aspect of prevention, German legislators have passed a series of ordinances in recent years that specify binding threshold limit values on installers and operators of stationary power supply facilities and transmitter installations that emit electromagnetic radiation and generate electromagnetic fields. The subject has also gained in importance beyond national boundaries. Thus, work is taking place on a third Directive on Physical Agents—Electromagnetic Fields—in the European Union with a view to standardizing threshold limit values throughout Europe.

Despite the threshold limit values that are already valid, experts continue to hold intensive debates on the extent to which electromagnetic fields are compatible. There is a widespread opinion that the values set down in German legislation are too high and that they do not comply with the concept of protection. While the first drafts of the Third Directive on Physical Agents—Electromagnetic Fields—suggest that the threshold limit values will be more rigorous, before the directive becomes law, these limit values have to be established once and for all, the Directive has to be published and it then has to be incorporated into national law.

As with all health effects caused by emissions, the interactions between human tissue and electromagnetic fields are critically affected by the dose, i.e. the strength of an electromagnetic field, and its duration of action.

For this reason, it can be an attractive prospect, especially in permanent abodes, and particularly indoors, to suitably protect the corresponding building against harmful effects of electromagnetic fields.

Based on the fact that, for the purpose of unfolding its optimum structural effectiveness, thermal insulation is very often extended to all external surfaces of the building DE 197 47 622 discloses a functional coupling between thermal insulation and an improvement in electromagnetic compatibility (EMC) (EMC protection). Such insulation panels of mineral wool are intended for the insulation of building facades and are furnished with a shield against electromagnetic fields (EMF) by application of a diffusion-permeable, electrically conducting layer to the mineral wool insulation panel. As a result, the use of such mineral wool panels can lead to effective shielding against electromagnetic fields. A prerequisite for this, however, is that the individual shielding elements are suitably connected to each other such that they are electrically conducting and earthed. Especially with large surfaces, such as facades, or subdivided areas with no direct contact between the insulation materials, such as insulation between rafters in sloped roofs, where a nonconducting wooden rafter is located between each insulation strip, this connection entails an additional increased outlay that necessitates the use of additional electrically conducting contact areas, which, for example, have to be bonded in suitable form to the various insulation panels such that they are electrically conducting.

Vapor retarders laminated onto individual strips of insulation and having an $s_D$ Value>10 m diffusion equivalent air layer thickness are known, e.g. consisting of an aluminium-laminated PE film, whose aluminium layer also possibly affords a certain degree of shielding that is not intended, however, especially since the strips, when installed, are not adequately connected to each other electrically and are not diffusion-permeable. The moisture-regulating, indoor vapor retarder with an EMF-shielding and, in contrast, diffusion-permeable layer of the invention thus synergistically combines the functional tasks of moisture protection or moisture regulation and EMF-shielding protection in one product in that the vapor retarder itself is furnished with at least one layer that shields against electromagnetic fields. In order that the vapor retarder of the invention may simultaneously perform the function of moisture regulation, however, the EMF-shielding layer must be designed to be diffusion-permeable.

The EMF-shielding layer may be designed to be electrically conducting or magnetically shielding.

In a preferred embodiment, the EMF-shielding layer is formed as an electrically conducting layer in the form of a laminated electrically conducting nonwoven. The nonwoven can be rendered electrically conducting, for instance, by working metal threads into it. Or, it is incorporated with graphite into the matrix as the electrically conducting substance.

Further alternative embodiments of an electrically conducting layer may, for example, be a bonded metal lattice, a printed layer of electrically conducting paints with an open-pore printed image or a vapor-deposited layer of electrically conducting substances, whereby the diffusion-permeable surface, especially, results from application with a thin layer by means of sputtering.

Earthing of the electrically conducting layers of several films with each other or with building elements, such as water pipes, can be simply effected by means of self-bonding electrically conducting aluminium adhesive tape. Due to the standard dimensions of a vapor retarder film of approximately 2 m width in lengths of at least 15 m, much less effort is needed to carefully electrically earth the films with each other compared with the solution, disclosed in DE 197 47 622, of individual surfaces of standard panel sizes measuring approx. 625 mm×1250 mm.

In a further preferred embodiment, the EMF-shielding layer is formed as a magnetic shielding layer in the form of a nonwoven doped with so-called μ- or mu-metal (magnetic, impermeable, e.g. highly permeable nickel-iron alloy) with paramagnetic, diamagnetic or ferromagnetic properties.

Further alternative embodiments of a magnetic shielding layer can, for example, be a metal whiskers layer or a vapor-deposited layer of magnetic shielding substances, with especially the diffusion-permeable surface again resulting from application by means of sputtering.

In contrast to electrically conducting layers, no earthing is required for magnetic shielding.

In a further preferred embodiment, the upper and lower sides of the EMF-shielding layer can be embedded in two especially moisture-regulating material layers, both of which are connected to the EMF-shielding layer. An alternative embodiment is an EMF-shielding layer that is only partially embedded in the two moisture-regulating material layers, said shielding layer having at least one edge strip not covered, for the purpose of earthing.

In the embedded embodiment, magnetic shielding with a nonwoven doped with μ-metal is preferred to an electrically conducting layer because of the earthing. In the embedded embodiment with edge strip, magnetic shielding and electrically conducting layers can equally be used. Preferentially, the EMF-shielding layer can take the form of an electrically conducting nonwoven or a metal lattice.

In all embodiments, additional diffusion-permeable layers can be applied for the purpose of improving the mechanical properties of the vapor retarder, especially for reinforcing and protecting the EMF-shielding layer against mechanical influences.

For shielding electromagnetic fields in the frequency range of mobile telephone networks in the range 1 GHz to 10 GHz, a mesh size of 5 mm, depending on the frequency, is preferred because this converts into a wavelength of 60 GHz and smaller. Since metal wire meshing with such mesh sizes is relatively inflexible compared with the moisture-regulating film, the use of a carbon nonwoven into which fine metal wires can also be incorporated is preferred. In order that a full-surface shielding effect may be obtained, shielding of all surfaces and thus an intact layer coat is indispensable.

Special importance attaches to the connection of the EMF-shielding layer with the moisture-regulating layer. The connection must not cause major overall impairment of the diffusion-permeability of the moisture-regulating vapor retarder where, for example, the use of an unsuitable binder or unsuitable coating of a binder generates a barrier layer that is impermeable to water vapor.

Thus, very thin layers of binder in the region of a few μm prove to be suitable in that a barrier layer is not formed on account of the very low layer thickness. Alternatively, a form of coating may be used that yields either a punctiform connection between the moisture-regulating and EMF-shielding layer or a binder layer with a network-like structure.

Figure 2:
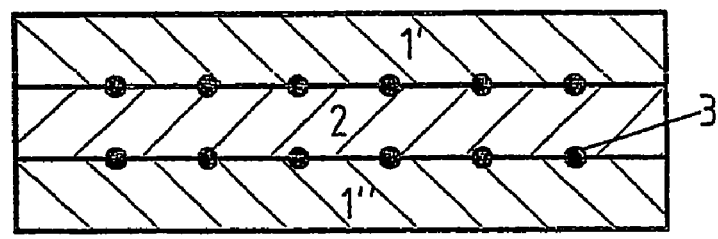
Figure 3:
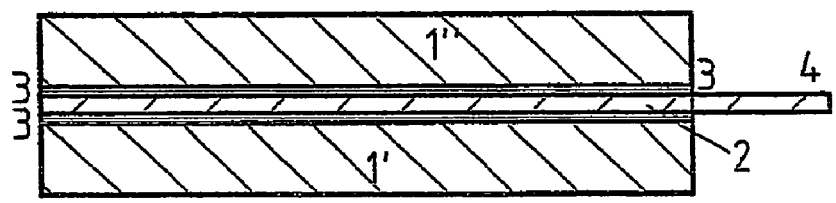
Figure 4:
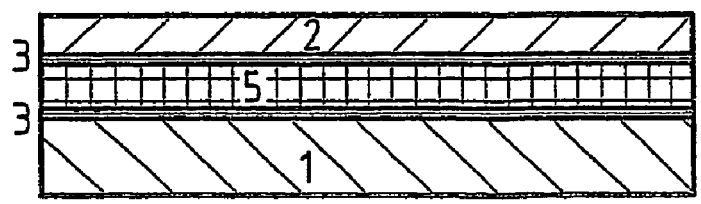
Figure 5:
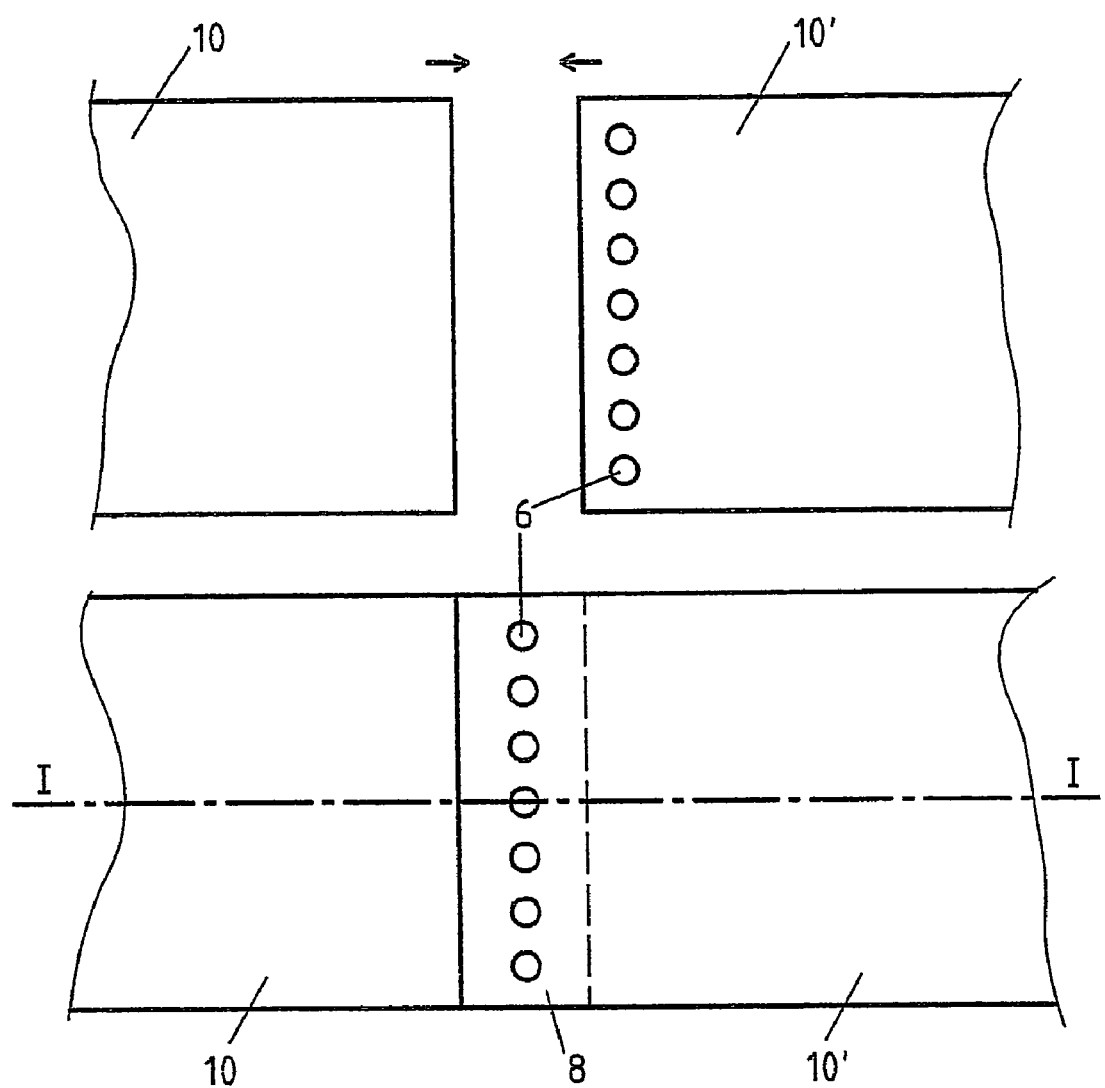
Figure 6:
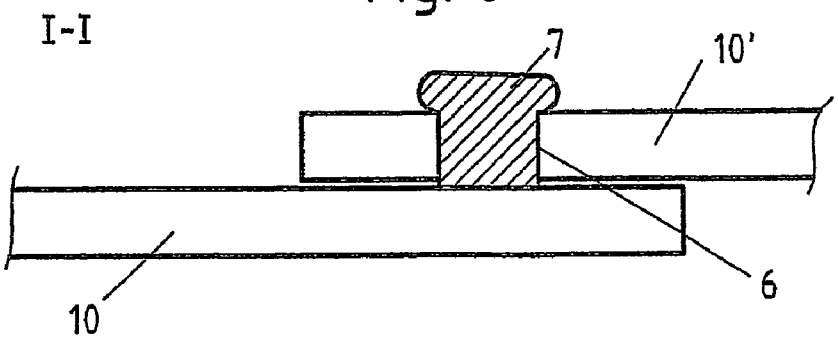

Further advantages, characteristics and features of the invention are apparent from the following description of preferred embodiments using the enclosed drawings. The drawings show in purely schematic form:

FIG. 1 A cross-section through a moisture-regulating vapor retarder in accordance with the present invention;

FIG. 2 A cross-section through a further moisture-regulating vapor retarder in accordance with the present invention;

FIG. 3 A cross-section through yet a further moisture-regulating vapor retarder in accordance with the present invention;

FIG. 4 A cross-section through a fourth moisture-regulating vapor retarder in accordance with the present invention;

FIG. 5 A plan view of two moisture-regulating vapor retarders of the present invention before and after mutual connection, and FIG. 6 A cross-sectional view of the connected vapor retarders from FIG. 5.

FIG. 1 shows a cross-section through a moisture-regulating vapor retarder with a structure consisting of a moisture-regulating layer of material (barrier layer) 1 in the form of a polyamide (PA) film of usual thickness of 50 μm and an electromagnetic-field-shielding layer 2 in the form of a carbon nonwoven that are connected to each other by means of a polyethylene (PE) adhesive 3. PE adhesive 3 is applied in a layer approx. 5 μm thick to PA film 1 such that it is diffusion-permeable. In this embodiment, electrical earthing is already ensured by contact between the carbon nonwoven and the contiguous building elements. To improve earthing, adhesive aluminium tape may additionally be used.

FIG. 2 shows a cross-section through a second embodiment of a moisture-regulating vapor retarder of the invention in which the electromagnetic-field-shielding layer 2 is embedded in two moisture-regulating material layers 1' and 1'', in the form of a PA film in each case. In order that the usual thickness of the moisture-regulating film of 50 μm may not be exceeded, the two PA films 1' and 1'' are each designed to be 25 μm thick. The electromagnetic-field-shielding layer 2 consists of a nonwoven doped with a μ-metal. The adhesive used is PE adhesive 3. Due to the sandwich shape of the moisture-regulating vapor retarder of the invention, bonding is effected in punctiform fashion. The use of a nonwoven doped with μ-metal allows earthing to be dispensed with. The vapor retarder has to be installed with adequate overlapping in order that overlapping of the EMF-shielding layers may produce an intact protective jacket.

FIG. 3 shows a cross-section through a third embodiment of a moisture-regulating vapor retarder of the invention in which the EMF-shielding layer 2 is mostly embedded between two PA films 1' and 1'', each 25 μm thick, and firmly bonded with PE adhesive 3 to these films. Embedding is such that an edge strip 4 approximately 10 cm wide protrudes at the side and is not embedded between the two PA films 1' and 1''. The EMF-shielding layer consists of a carbon nonwoven doped with incorporated fine metal threads. The edge strip 4 protruding at the side safeguards electrical earthing on connection to contiguous building elements. Additionally, this strip may be used to join the individual strips of the vapor retarder to each other such that they are electrically conducting, e.g. by adhesive aluminium tape.

FIG. 4 shows a cross-section through a fourth embodiment of a moisture-regulating vapor retarder of the invention in which, as reinforcing and protective layer 5 against mechanical influences, an additional layer of a polyethylene terephthalate (PET) material 5 is formed between a 50 μm thick PA film 1 and an EMF-shielding layer 2 of electrically conducting carbon nonwoven. This PET layer also serves as a primer coat for the PA adhesive, which firmly connects the PA film 1, PET layer 5 and EMF-shielding layer 2 to each other.

FIG. 5 shows a plan view of two moisture-regulating vapor retarders 10 and 10' of the invention before (upper picture) and after (lower picture) mutual connection. To simplify mutual connection, at least one of the vapor retarders (in this case vapor retarder 10') has a perforated edge with several apertures 6 on which vapor retarder 10 comes to lie when the vapor retarders 10' and 10 are connected. This produces an overlapping region 8 in which the two vapor retarders 10 and 10' overlap.

As may be readily seen in the cross-sectional view in FIG. 6, adhesive 7 is filled into the apertures 6 in the overlapping region 8 such that mutual connection of vapor retarders 10 and 10' is effected, without the need for full-surface bonding.

Aside from the embodiment shown in which the holes are punched direct into the layer composite of the moisture-regulating vapor retarder of the invention, this type of connecting method may naturally also be used for the embodiment shown in FIG. 3 with edge strips or connecting lobes or contact lobes 4. Correspondingly, provision would be made for the apertures 6 only in the edge strip or contact lobes 4, with the connection being effected by adjacent contact lobes.

Overall, the combination of a moisture-regulating barrier layer in the form of, e.g., a polyamide film with an EMF-shielding layer simultaneously also proves advantageous in that the polyamide film becomes more tear resistant and thus can be better processed and is more resistant to external mechanical influences.

The invention claimed is:

1. A vapor retarder for indoor sealing of buildings, especially roof structures, with at least one barrier layer retarding the passage of moisture vapor, especially water vapor, said barrier layer being formed from a material with moisture-adaptive water vapor diffusion resistance, said material changing its diffusion resistance as a function of ambient moisture, characterized by the fact that the vapor retarder has at least one electromagnetic-field-shielding layer for shielding electromagnetic fields in the frequency range of mobile telephone networks, which is formed so as to be permeable to diffusion and which is in the form of an electrically conducting film and/or in the form of a magnetic-shielding film, or comprises a laminated, electrically conducting nonwoven, an especially bonded metal lattice or a vapor-deposited layer of electrically conducting substances each having a mesh size of 5 mm.

2. The vapor retarder of claim 1, wherein the electromagnetic field shielding layer is connected to the barrier layer such that it is diffusion permeable.

3. The vapor retarder of claim 1, wherein the fact that the electromagnetic field shielding layer is in the form of an electrically conducting layer and/or in the form of a magnetic shielding layer.

4. The vapor retarder of claim 1, wherein the fact that the electromagnetic-field-shielding layer comprises a laminated, electrically conducting non woven, an especially bonded metal lattice, a printed layer of electrically conducting coatings, a vapor deposited layer of electrically conducting substances, a nonwoven doped with a μ-metal, a metal whisker layer or a vapor deposited layer of magnetically shielding substances.

5. The vapor retarder of claim 1, wherein the electromagnetic field shielding layer is incorporated into the barrier layer, especially embedded into at least two barrier layers.

6. The vapor retarder of claim 1, wherein the layer electromagnetic-field-shielding layer protrudes at least partially, especially at a side edge, beyond the barrier layer to connect with the adjacent vapor retarders.

7. The vapor retarder of claim 1, wherein at least on one side provision is made in the edge region for apertures (6) that serve to make connection with adjacent vapor retarders, especially via incorporated adhesives.

8. The vapor retarder of claim 1, wherein the vapor retarder further has at least one preferentially diffusion-permeable reinforcement and/or protective layer.

9. The vapor retarder of claim 8, wherein the fact that the reinforcement or protective layer comprises a nonwoven based on polyethylene terephthalate (PET) or fiberglass.

10. The vapor retarder of claim 1, wherein the fact that the layers are firmly connected to each other by an especially diffusion-permeable binder layer.

11. The vapor retarder of claim 10, wherein the especially diffusion permeable binder layer is punctiform, network like or is a full surface layer of very low thickness.

12. The vapor retarder of claim 1, wherein a polyethylene (PE) adhesive is intended as the binder for connecting the layers.

13. The vapor retarder of claim 1, wherein the material of barrier layer with moisture regulating water vapor diffusion resistance has a water vapor diffusion resistance SD value of 2 to 5 m diffusion equivalent air layer thickness at a relative air humidity in the range of 30% to 50% in the atmosphere surrounding the vapor retarder and a water vapor diffusion resistance SD value that is <1 m diffusion equivalent air layer thickness at a relative air humidity in the range 60% to 80%.

14. The vapor retarder of claim 1, wherein the vapor retarder and/or the individual layers, such as barrier layer, EMP-shielding layer and reinforcement or protective layer are formed as a film.

15. The vapor retarder of claim 1, wherein the barrier layer is formed of polyamide 66, polyamide 6, polyamide 4 or polyamide 3.

* * * * *